M. J. DEVANNEY.
STEERING GEAR FOR AUTOMOBILES.
APPLICATION FILED JULY 11, 1913. RENEWED DEC. 6, 1915.

1,169,468.

Patented Jan. 25, 1916.
2 SHEETS—SHEET 1.

Witnesses
E. O. Crocker
Henry T. Bright

Inventor
M. J. Devanney
By
Attorneys

M. J. DEVANNEY.
STEERING GEAR FOR AUTOMOBILES.
APPLICATION FILED JULY 11, 1913. RENEWED DEC. 6, 1915.
1,169,468.
Patented Jan. 25, 1916.
2 SHEETS—SHEET 2.
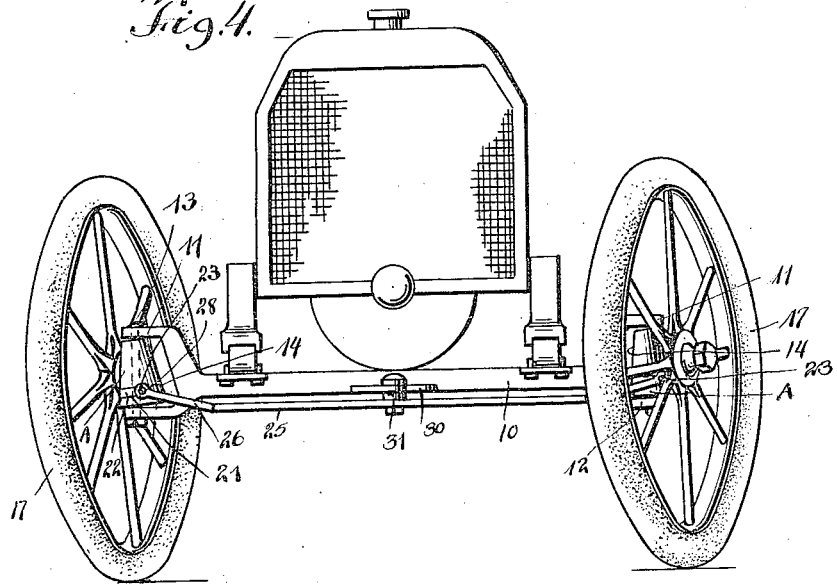
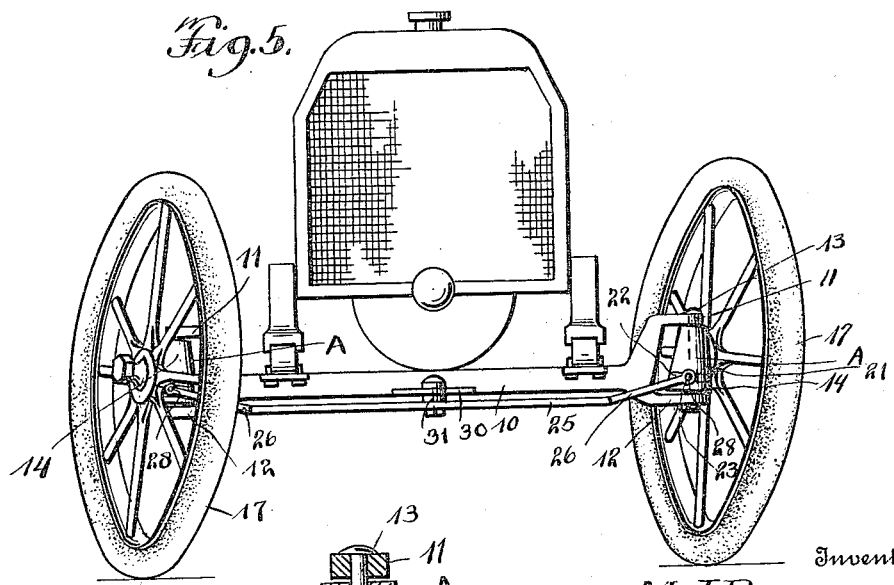
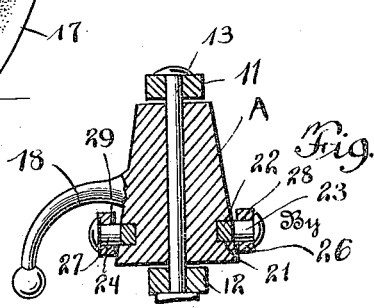

UNITED STATES PATENT OFFICE.

MICHAEL J. DEVANNEY, OF BLOOMSBURG, PENNSYLVANIA.

STEERING-GEAR FOR AUTOMOBILES.

1,169,468. Specification of Letters Patent. Patented Jan. 25, 1916.

Application filed July 11, 1913, Serial No. 778,542. Renewed December 6, 1915. Serial No. 65,419.

*To all whom it may concern:*

Be it known that I, MICHAEL J. DEVANNEY, a citizen of the United States, residing at Bloomsburg, in the county of Columbia, State of Pennsylvania, have invented certain new and useful Improvements in Steering-Gear for Automobiles; and I do hereby declare the following to be a full, clear, and exact description of the invention, such as will enable others skilled in the art to which it appertains to make and use the same.

This invention relates to steering gears for automobiles.

The object of the invention resides in the provision of a steering gear for automobiles adapted during its operation to shift the front wheels of the automobile to a position of downward inclination away from the direction in which the automobile is turning whereby the possibility of skidding, upsetting, tearing off the tire or snapping the axle is obviated.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1:
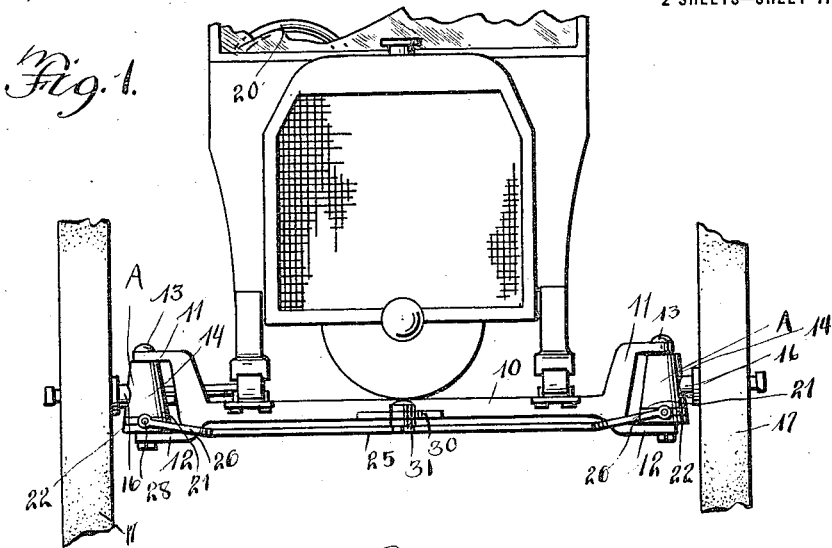
Figure 2:
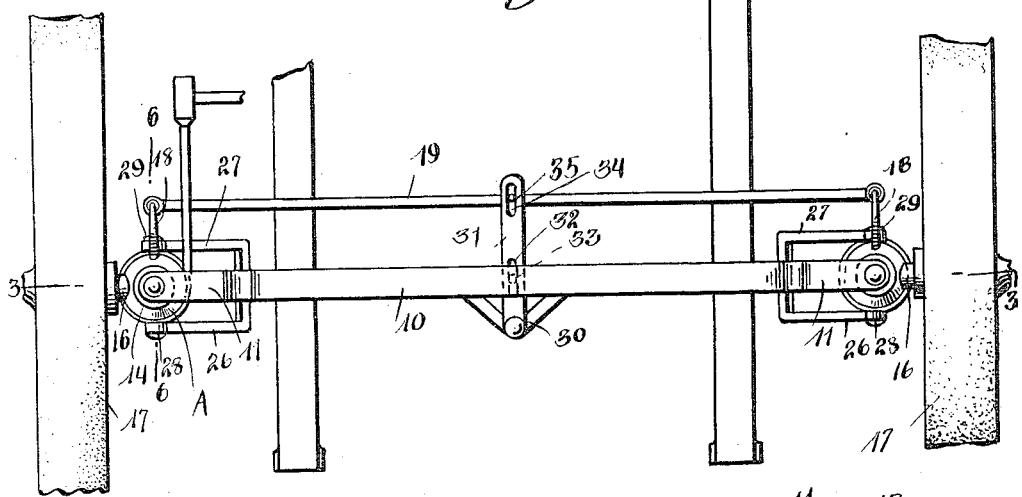
Figure 3:
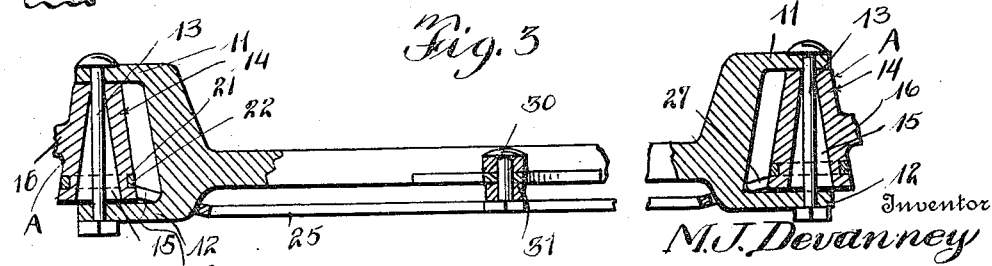

Figure 1 is a front elevation of the steering gear with the latter set to steer the automobile straight ahead; Fig. 2, a plan view of what is shown in Fig. 1; Fig. 3, a section on the line 3—3 of Fig. 2; Fig. 4, a view similar to Fig. 1 with the parts set to steer to the right; Fig. 5, a view similar to Fig. 4 with the parts set to steer to the left, and Fig. 6, a section on the line 6—6 of Fig. 2.

Referring to the drawings 10 indicates the front axle of an automobile which has its ends forked to form arms 11 and 12. Connecting each of the arms 11 and 12 is a bolt 13 and rotatably mounted on each of the bolts 13 is a knuckle A. Each of the knuckles A includes a body portion 14 having a tapered longitudinal passage 15 through which passes the bolt 13. The major end of the passage 15 is disposed at the lower end of the body 14 so that said body is not only rotatable on the bolt 13 but is also capable of a limited lateral swinging movement at its lower end. Projecting laterally from each body portion 14 of the knuckle A is a stub shaft 16 upon which is rotatably mounted in the usual and well known manner the wheel 17. Projecting laterally from the body portion 14 of each knuckle A is an arm 18 and these arms are connected at their free ends by a steering rod 19 which latter is suitably connected to a steering wheel 20 whereby the rotation of the latter will effect longitudinal movement of the rod 19 and resultant corresponding rotation of the knuckles A on the bolt 13. Each of the body portions 14 of the knuckle A is provided with a circumscribing groove 21 disposed below the arm 18. Rotatably mounted in this groove 21 is a ring 22 provided with diametrically opposite laterally projecting fingers 23 and 24. Disposed beneath the axle 10 is a bar 25 the terminals of which are forked to form arms 26 and 27 which latter are provided with openings 28 and 29 respectively receiving the fingers 23 and 24 of the adjacent ring 22. Mounted on the axle 10 is a bracket 30 upon which is pivoted one end of a lever 31. This lever 31 is provided with a slot 32 disposed directly over the bar 25 and receiving a stud 33 formed on said bar. The lever 31 is further provided with a slot 34 which slidably receives a stud 35 formed on the steering rod 19.

In the operation of the device it will be apparent that when the steering rod 19 is moved to effect a steering to the right the lever 31 will be moved so as to shift the bar 25 to the left and this movement of the bar 25 will swing the lower ends of the knuckles A to the left and thus dispose the wheel 17 in downward inclination away from the direction in which the automobile is turning. With the wheels in this position it will be apparent that skidding is provided against. In operating the steering gear to turn to the left the movements of the various parts will be reversed as will be obvious.

What I claim is:—

In a steering gear, the combination of an axle, a pin mounted on each end of the axle at right angles to the latter, knuckles rotatably mounted on said pins respectively, said knuckles being each provided with a tapered passage through which the pins pass and the major end of said passage being disposed at the lower end of the knuckle whereby said knuckles may be swung bodily in a lateral direction at their lower ends, means for rotating said knuckles simultaneously in the same direction, and means operated by the actuation of the first named means for simultaneously swinging the lower ends of the knuckles in a direction opposite to the direction of steering.

In testimony whereof I affix my signature in the presence of two witnesses.

MICHAEL J. DEVANNEY.

Witnesses:
JOHN F. WATSON,
L. M. VENNAN.

Copies of this patent may be obtained for five cents each, by addressing the "Commissioner of Patents, Washington, D. C."